United States Patent
Robinson et al.

Patent Number: 5,501,554
Date of Patent: Mar. 26, 1996

[54] DEBURRING TOOL

[75] Inventors: William A. Robinson, Canton, Mich.;
William R. Robinson, Juno Beach, Fla.

[73] Assignee: E-Z Burr Tool Company, Plymouth, Mich.

[21] Appl. No.: 333,038

[22] Filed: Nov. 1, 1994

Related U.S. Application Data

[63] Continuation-in-part of Ser. No. 164,745, Dec. 9, 1993, Pat. No. 5,358,363.

[51] Int. Cl.$^6$ .................................................. B23B 51/00
[52] U.S. Cl. .......................... 408/153; 408/180; 408/181
[58] Field of Search .............................. 408/93, 153, 180, 408/181, 187

[56] References Cited

U.S. PATENT DOCUMENTS

| | | |
|---|---|---|
| 3,017,791 | 1/1962 | Fried ........................................ 408/180 |
| 4,086,018 | 4/1978 | Robinson et al. . |
| 4,147,463 | 4/1979 | Robinson . |
| 5,277,528 | 1/1994 | Robinson . |
| 5,358,363 | 10/1994 | Robinson .............................. 408/153 |

*Primary Examiner*—Daniel W. Howell
*Attorney, Agent, or Firm*—Reising, Ethington, Barnard & Perry

[57] ABSTRACT

A deburring tool, and a cutting tool blade and pivot member therefor. The arbor is formed with a cutting blade recess for a cutting tool having a flat resilient blade. The blade is releasably secured in the recess by a pivot member extending transversely through the recess. The cutting tool blade includes an open-ended slot having an arcuate closed end and one or more flat surfaces. The pivot member has a shank portion with arcuate and flat sides, and is selectively rotatable in the cutting blade slot between a locked position preventing separation of the blade from the pivot member, and an unlocked position permitting separation of the blade and pivot member.

6 Claims, 3 Drawing Sheets

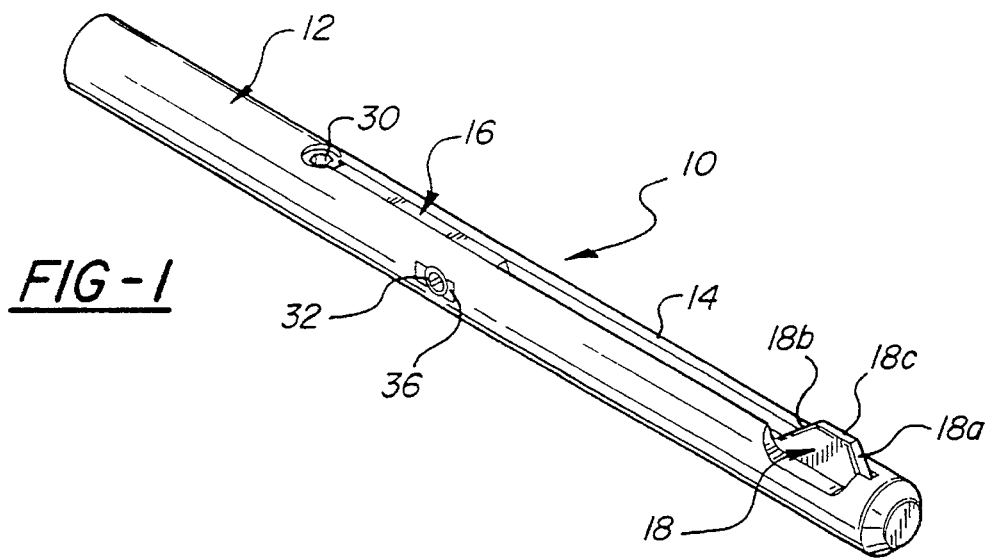
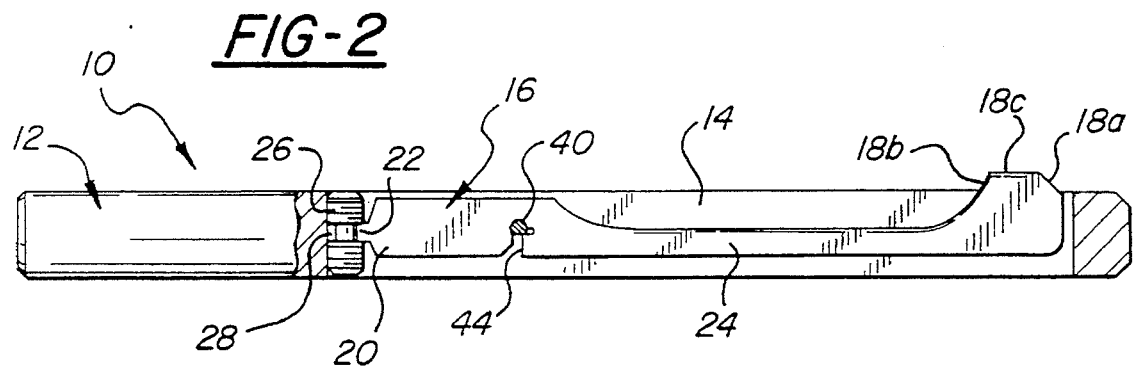
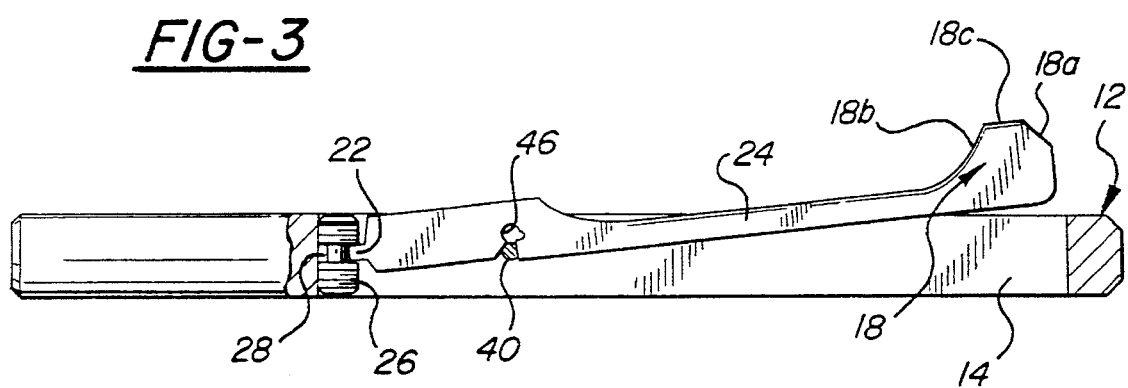

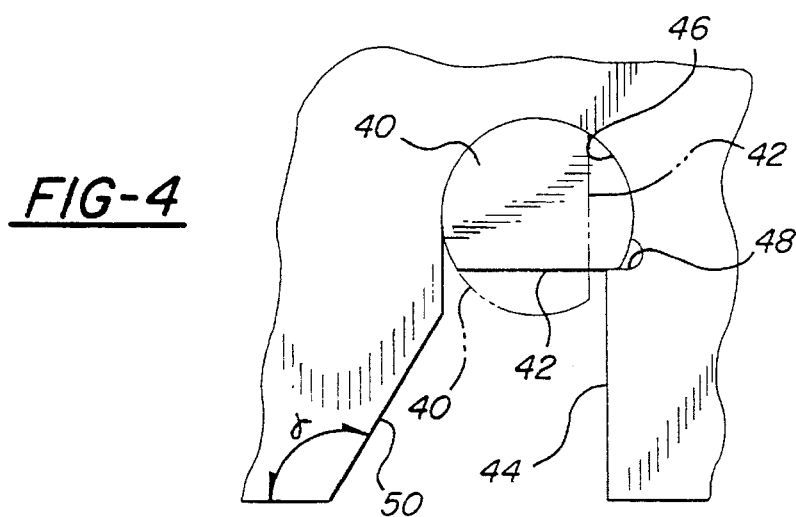
FIG-4
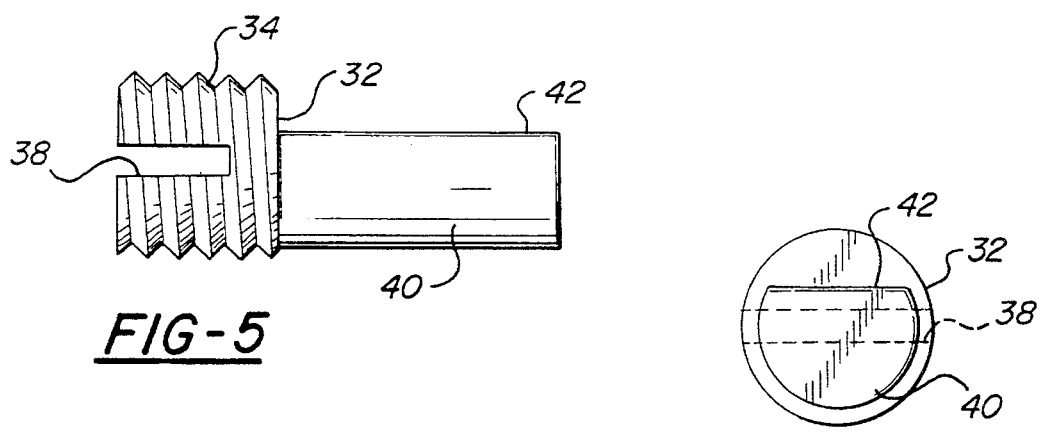
FIG-5
FIG-6
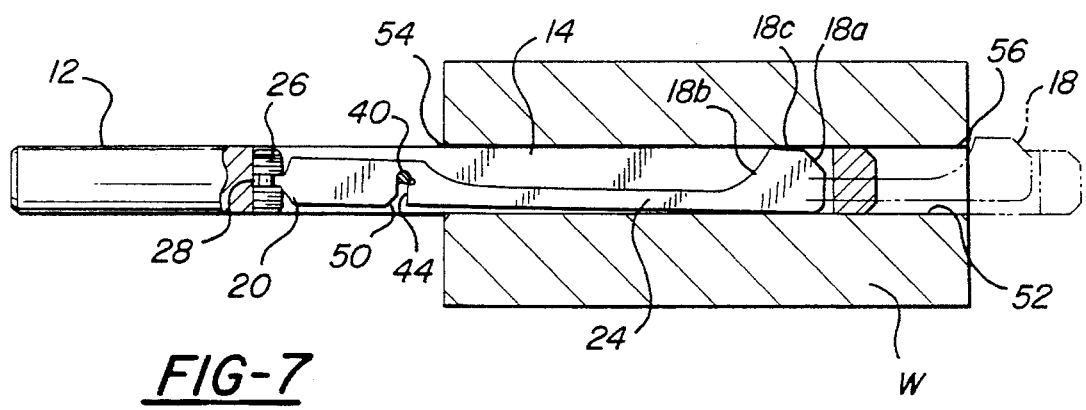
FIG-7

DEBURRING TOOL

RELATED APPLICATIONS

This is a continuation in part of U.S. Ser. No. 08/164,745, filed on Dec. 9, 1993, now U.S. Pat. No. 5,358,365 the entire disclosure of which is incorporated herein by reference.

BACKGROUND OF THE INVENTION

1. Technical Field

This invention relates to deburring tools and is particularly concerned with the construction of a deburring tool having a replaceable and adjustable cutting head.

2. Description of the Prior Art

This invention constitutes an improvement over the cutting tools of the type disclosed in U.S. Pat. Nos. 4,086,018 (Apr. 25, 1978) and 4,147,463 (Apr. 3, 1979), each of which disclose deburring tools having cutting tools mounted in a cutting tool recess in an arbor. In the '018 patent, a cutting blade 10 is mounted in the arbor in spaced pins 16 and 14. In the '463 patent, a blade 10 is mounted in the arbor by means of a pin 16 and an adjustment screw 18 to permit selective pivotal adjustment of the blade about pin 16. See also U.S. Pat. No. 5,277,528 (Jan. 11, 1994) as well as the patents and other prior art documents identified in each of the '018, '463 and '528 patents.

SUMMARY OF THE INVENTION AND ADVANTAGES

The invention addresses the problems in prior art deburring tools having an arbor formed with a cutting blade recess and a replaceable unitary cutting tool made from material such as M-2 high speed tool steel. The cutting tool is received in the recess of the arbor. A fastener is employed to secure the cutting tool to the arbor with the cutting head projecting from the recess. In accordance with the present invention, the cutting blade is formed with a keyhole-type slot for receiving a pivot member mounted transversely in the arbor for selective rotation between locking and unlocking positions. The pivot member has a shank portion formed with at least one flat surface engageable with a complementary flat surface in the keyhole slot of the cutting blade in the locking position to prevent separation of the cutting blade from the pivot member. When the pivot member is rotated to the unlocking position, the complementary flat surfaces disengage from each other, and the cutting blade can separate from the pivot member and permit the blade to be removed from the arbor.

DESCRIPTION OF THE DRAWINGS

FIG. 1 is a perspective view a deburring tool embodying a first form of the invention;

FIG. 2 is a side view, partially in section, of the deburring tool of FIG. 1 with the cutting tool in the locked position;

FIG. 3 is a side view similar to FIG. 2 with the cutting took unlocked and ready for removal from the arbor;

FIG. 4 is an enlarged fragmentary side view showing the keyhole slot of the cutting blade receiving the pivot member for rotation between its locked position (in full lines) and unlocked position (in phantom lines);

FIG. 5 is a side view of the pivot member;

FIG. 6 is an end view of the pivot member;

FIG. 7 is a sectional view of the deburring tool of FIGS. 1–6 disposed within a workpiece;

DETAILED DESCRIPTION OF THE BEST MODE OF CARRYING OUT THE INVENTION

Figure 8:
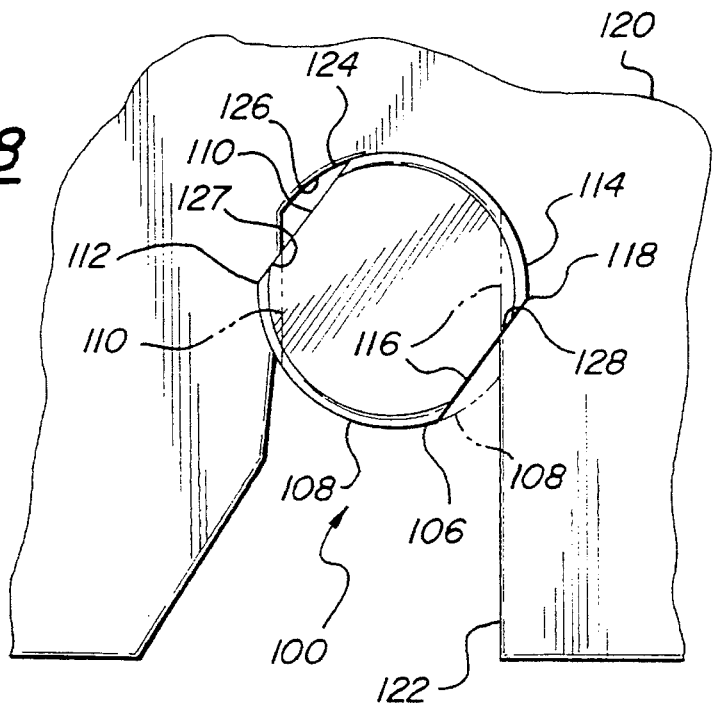
FIG. 8 is view similar to FIG. 4 illustrating a second form of the cutting blade slot and pivot member.

The deburring tool is collectively designated by reference numeral 10 in FIGS. 1–3, and includes an elongated arbor 12 having a cutting blade recess 14 extending parallel to the longitudinal axis of the arbor 12. The deburring tool 10 also includes a unitary cutting tool 16 which is preferably cut from M-2 high speed tool steel stock using a wire electrical discharge machine (EDM), although this invention is not limited to a blade of any specific material or one that is formed by a specific process.

The cutting tool 16 includes a cutting head 18, a trailing terminal portion 20 having a rearwardly projecting tang 22 and an elongated flat resilient blade 24 extending therebetween.

The deburring tool 10 also includes a mounting means for securing the cutting tool 16 to the arbor 12 such that the cutting head 18 projects from the recess 14. As disclosed in U.S. Pat. No. 4,147,463, the mounting means includes an adjustable screw 26 mounted in the arbor 12 and formed with an annular groove 28 which receives the tang 22. The tang 22 projects into engagement with the adjustable screw 26. A hexagon tool recess 30 (FIG. 1) is formed in the screw 26 for receiving a tool (not shown) to rotatably adjust the screw 26.

The mounting means also includes a pivot member 32, spaced from the adjustable screw 26, which extends transversely through the recess 14 and the blade 24 to define a pivot axis for the cutting tool 16. Rotation of the adjustable screw 26 in the arbor 12 causes the blade 24 to pivot about the axis of the pivot member 32 to adjust the unstressed position of the cutting head 18 with respect to the arbor 12.

FIGS. 4, 5 and 6 illustrate the pivot member 32 which includes a threaded head portion 34 and a shank portion 40 extending from the head portion. The head portion is received in a threaded hole 36 in the arbor 12, and has a screw driver slot 38. The shank portion 40 has a semi-circular cross-section with an arcuate portion 40 and a flat side 42 extending between the edges of the arcuate portion 40.

The blade 24 includes an open-ended keyhole-type slot 44 extending into the middle of the blade from the base thereof. The slot 44 has an arcuate closed end 46. A shoulder 48 is formed at one end of the arc which defines the arcuate closed end 46.

The pivot member 32 is selectively rotatable within the slot 44 between a locked position to prevent separation of the cutting blade 24 and pivot member 32, and an unlocked position that permits the pivot member to pass through the slot 44 and permit separation of the blade from the pivot member 32, and hence from the arbor 12 (See FIG. 3).

The unlocked position of the shank portion 40 is shown in FIG. 4 in phantom lines, which permits separation of the blade 24 from the pivot member 32, and hence removal of the blade from the arbor 12. To install the blade, the shank portion is rotated to the unlocked position (the phantom line position of FIG. 4) and when the arcuate portion 40 of the pivot member 32 is received in the slot 44 as the blade is mounted in the recess 14 of the arbor, it can be rotated from the unlocked (phantom line) position of FIG. 4 to the locked (full-line) position in which the flat surface 42 engages the shoulder 48 to prevent separation of the blade from the pivot member. In the illustrated embodiment, rotation of the head portion 44 one-quarter turn (or 90°) causes the shank portion 40 to move between the locked and unlocked positions. At the same time, the blade 24 is permitted to pivot about the locking screw 32 during deburring operations as explained in greater detail below.

As shown in FIGS. 2–4, the slot 44 includes a lead-in portion 50 which defines an obtuse angle α with respect to one side of the blade 24 to facilitate assembly and disassembly of the pivot member 32 and slot 44. To replace a worn cutting tool 16, the flat side 42 of the shank 40 is rotated out of engagement with the shoulder 48 and the blade 24 is lifted out of the arbor. This operation can be performed while the arbor remains mounted in a machine used to drive the deburring tool.

As indicated earlier, the cutting head 18 is supported by the blade 24 in an operable position in which it projects from the recess 14 in the unstressed condition of the blade 24 shown in FIGS. 1 and 2. However, the portion of the blade 24 between the cutting head 18 and the pivot member 32 is resiliently yieldable so that the cutting head 18 can move in the recess 14 between the full-line and phantom-line positions illustrated in FIG. 7.

The cutting head 18 includes a top, non-cutting surface 18C with a leading cutting edge 18A and a trailing cutting edge 18B extending angularly from the opposite ends of the top edge 18C. FIG. 7 illustrates a workpiece W in cross-section formed with a hole 52. The hole 52 may be formed by drilling or some other operation. The hole 52 has a leading edge 54 and a trailing edge 56.

At the beginning of the deburring operation, the arbor 12 mounted in a rotating chuck or tool holder is rotated and advanced toward the right, as viewed in FIG. 7, with the leading edge 18A engaging the leading cutting edge 54 of the hole 52 to remove burrs and form a slight chamfer as indicated by reference numeral 54 in FIG. 7. The arbor first engages the end 54 of the hole 52 and advances to the right to the phantom line position illustrated in FIG. 7. The top, non-cutting edge 18C resiliently engages the wall of the hole 52 as the blade moves toward the right through the hole 52.

When the cutting head 18 clears the trailing end of the hole 52 at 56, as indicated in phantom lines in FIG. 7, the direction of the movement of the tool is reversed and the trailing cutting edge 18B removes burrs and slightly chamfers the trailing end 56 of the hole 52 of the workpiece W. As the blade is withdrawn toward the left in FIG. 7, the engagement of the trailing edge 18B with the end 56 of the hole 52 causes the blade 24 to yield and permit the cutting head 18 to assume the full line position shown in FIG. 7 as the tool is withdrawn toward the left from the hole 52 of the workpiece W. The amount of pressure applied by the cutting edges 18A and 18B is determined by the resiliency of the portion of the blade 24 between the slot 44 and the head 18 in the unstressed position of the cutting head 18.

Figure 9:
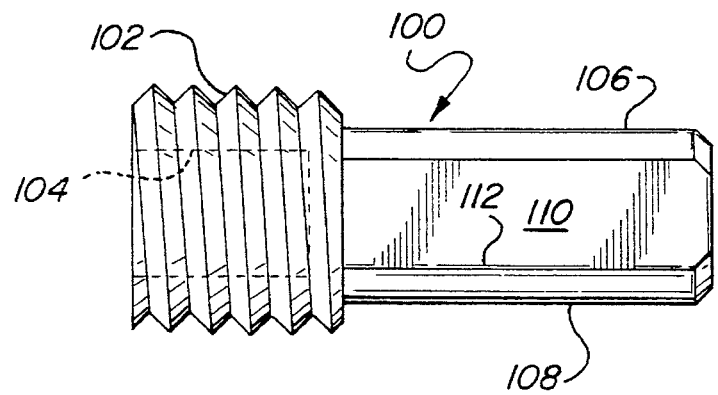
FIG. 9 is a side view of the pivot member of FIG. 8.
Figure 10:
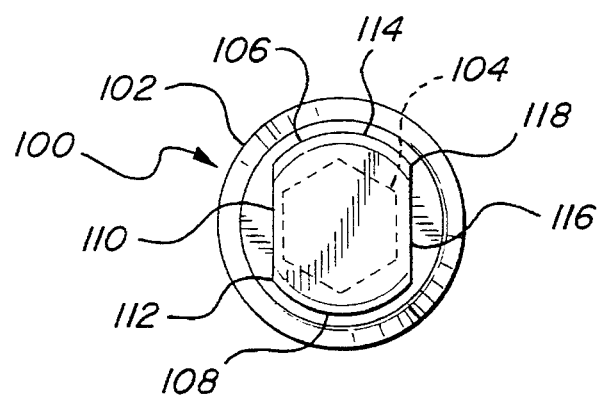
FIG. 10 is an end view of the pivot member of FIG. 8.

FIGS. 8–10 illustrates a second embodiment of the pivot member which is designated by reference numeral 100. The pivot member 100 has a threaded head portion 102 with a tool receiving recess 104.

The pivot member 100 also has a shank portion 106 which extends from the head portion 102. The shank portion 106 has a pair of parallel flat sides 110 and 116 extending between the edges 112 and 118 of a pair of arcuate sides 106 and 108, respectively.

The resilient blade 120, shown partially cut away in FIG. 8, includes an open-ended keyhole-type slot 122 for receiving the shank portion 106. The slot 122 has a closed end 124 having an arcuate slot surface 126 concentric with the arcuate shank surfaces 106 and 108.

As shown in FIG. 8, slot 122 also has oblique flat edge surfaces 127 and 128 respectively engaging the flat sides 110 and 116 of the pivot member shank (in the full line, locked position of FIG. 8) to prevent separation of the blade and pivot member, while at the same time, permitting yieldable clockwise rotation of the blade about the pivot member during the operating conditions illustrated in FIG. 7.

While specific forms of the invention are described in the foregoing specification and illustrated in the accompanying drawings, the invention is not limited to the exact construction shown. To the contrary, modifications in the construction and arrangement of parts, all falling within the scope and spirit of the invention, will be apparent to those skilled in the art.

We claim:

1. A deburring tool comprising:

an arbor formed with an elongated recess extending longitudinally therein, a flat resilient cutting blade received in recess;

a pivotal blade retention and release member mounted in said arbor and extending transversely with respect to the longitudinal axis thereof, said retention and release member having a head portion mounted for turning movement in said arbor and having a shank portion extending from said head portion through said recess, said shank portion having a periphery with at least one arcuate surface flanked by at least two non-arcuate surfaces defining opposite sides of said shank portion;

said cutting blade having an open-ended slot for receiving said shank portion therein, said open-ended slot being defined by an internal edge in said blade having one arcuate surface complementary to the arcuate surface of said shank portion and flanked by at least two non-arcuate slot surfaces complementary to said non-arcuate surfaces of said shank portion; and said retention and release member being selectively rotatable in said arbor and with respect to said blade between a blade retention position in which said non-arcuate surfaces of said shank portion engage said complementary non-arcuate slot surfaces of said open-ended slot to prevent separation of said blade from said retention and release member and to condition said tool for deburring operation, and a blade release position in which non-arcuate surfaces of said shank portion move from engagement with said non-arcuate surfaces of said slot to a point whereby said shank portion can pass through said open-end of said slot to permit separation of said blade and from said blade retention and release member and from said arbor for blade repair and replacement.

2. For use in a deburring tool having an elongated arbor with a cutting blade recess therein and a cutting blade having an attachment slot therein received in said recess, a pivotal blade retention and release member, said retention and release member having a head portion and an elongated shank portion extending from said head portion through said attachment slot and cooperating therewith to releasably retain said blade in said arbor, said retention and release member and said cooperating attachment slot being characterized by cooperating arcuate and non-arcuate surfaces for the selective retention and release of said blade with respect to said arbor, said shank portion of said retention and release member having an arcuate peripheral surface and having non-arcuate peripheral surfaces flanking said arcuate peripheral surface, said attachment slot having an arcuate surface to match and receive the arcuate peripheral surface of said shank portion and further having non-arcuate surfaces adjacent to opposite ends of said arcuate surface for positive engagement with the non-arcuate surface of said shank to establish a blade retention position in response to the turning of said blade retention and release member in said arbor from said release position.

3. For use in a deburring tool having an elongated arbor with a cutting blade recess for receiving a cutting blade, a cutting blade provided with an open-ended slot for receiving a pivotal blade retention and release member therein, said blade retention and release member having a head portion mounted for turning movement in said arbor and a shank extending axially from said head portion into said recess and through said slot, said open-ended slot of said blade and said shank of said blade release and retention member being each characterized by an arcuate surface and a flattened surface near each end of said arcuate surface, said open-ended slot being sized to receive the shank of said blade retention and release member so that said arcuate slot surface of said blade selectively engages said arcuate surface of said shank in a first and blade release position and wherein said blade retention and release member can be turned from said first and blade release position to a position wherein said flattened surfaces of said shank are moved into engagement with said flattened surfaces of said slot to operatively retain said blade in said arbor.

4. A deburring tool comprising:

an arbor extending about a longitudinal axis and formed with an elongated recess longitudinally formed therein, a flat and thin resilient cutting blade received in said recess;

a pivotal blade retention and release member mounted in said arbor and extending transversely with respect to the longitudinal axis thereof, said blade retention and release member having a head portion mounted for turning movement in said arbor and having a shank portion extending therefrom through said recess, said shank portion having at least one arcuate shank surface extending between at least two flat and linearly extending shank surfaces;

said cutting blade having an open-ended slot for receiving said shank portion therein, said open-ended slot having an interior end formed with at least one arcuate slot surface complementary to the arcuate shank surface of said shank portion and at least two linear slot surfaces complementary to said linearly extending shank surfaces of said shank portion of said retention and release member such that said arcuate slot surface is disposed between said linearly extending slot surfaces; and said retention and release member being selectively rotatable in said arbor with respect to said blade between a blade retention position in which said linearly extending shank surfaces engage said complementary linearly extending slot surfaces of said slot to prevent separation of said blade from said retention and release member and to condition said tool for deburring operation, and a blade release position in which said shank portion can pass through the open end of said slot and permit separation of said blade from said pivotal blade retention and release member and from said arbor for blade repair and replacement.

5. The deburring tool of claim 4, wherein said linearly extending surfaces of said shank portion of said blade retention and release member are parallel to one another and said linearly extending surfaces of said slot are parallel to one another and wherein said blade retention and release member has an enlarged head threadedly mounted in said arbor.

6. The deburring tool of claim 4 or 5, wherein said arcuate slot surface is concave and said arcuate shank surface is convex and has a curvature to match the curvature of the concave arcuate slot surface, said tool further including an adjusting screw operatively mounted in said arbor at one end of said recess and in alignment therewith, said adjusting screw being operatively connected to said blade and movably mounted in said arbor to turn said blade on said pivotal blade retention and release member.

\* \* \* \* \*

UNITED STATES PATENT AND TRADEMARK OFFICE
CERTIFICATE OF CORRECTION

PATENT NO.   : 5,501,554
DATED        : March 26, 1996
INVENTOR(S)  : William A. Robinson, William R. Robinson It is certified that error appears in the above-identified patent and that said Letters Patent is hereby corrected as shown below:

Column 1, line 2, delete "5,358,365" and insert
          --5,358,363-- therefor.

Signed and Sealed this

Eighth Day of October, 1996

Attest:

BRUCE LEHMAN

Attesting Officer     Commissioner of Patents and Trademarks